United States Patent

Dials et al.

[11] Patent Number: 6,056,280
[45] Date of Patent: May 2, 2000

[54] AUTO-LOADING LIFT SPRING FOR AN ELECTRONIC DEVICE

[75] Inventors: Edward Nela Dials, Apex; Aubrey Lamond Hodges, Creedmoor; Steven Richard Luglan, Raleigh, all of N.C.

[73] Assignee: International Business Machines Corporation, Armonk, N.Y.

[21] Appl. No.: 09/049,264

[22] Filed: Mar. 27, 1998

[51] Int. Cl.[7] .......................................................... F16F 1/06

[52] U.S. Cl. ............................ 267/155; 267/157; 361/685

[58] Field of Search .......................... 312/223.1; 267/155, 267/273, 275, 285; 248/573, 918, 292.12; 361/679, 680, 681, 682, 683, 684, 685, 686

[56] References Cited

U.S. PATENT DOCUMENTS 5,712,761  1/1998  Dials et al. ................................ 361/685

Primary Examiner—Christopher P. Schwartz
Assistant Examiner—Lan Nguyen
Attorney, Agent, or Firm—Anthony N. Magistrale

[57] ABSTRACT

A lift spring assembly is disclosed for small computers and similar electronic devices of the type that has a base and an upper component assembly that raises when a release is pressed to provide access to computer devices such as printing, data storage and other devices mounted in the assembly. The lift spring is a closed linkage that is held into the base between supports and stops so that the assembly may be removed for service without disconnecting or otherwise disassembling the lift spring mounting.

11 Claims, 7 Drawing Sheets

AUTO-LOADING LIFT SPRING FOR AN ELECTRONIC DEVICE

BACKGROUND OF THE INVENTION

1. Field of the Invention

This invention relates to small computers and similar electronic devices of the type that has a base assembly and an upper or component assembly that is raised by a spring into operating position, providing operator access to computer devices such as printing, data storage and other devices mounted in the assembly.

2. Description of the Prior Art

The use of a spring to balance and raise an upper assembly into an open or operating position is known in the art in early versions of the IBM Aptiva S-series personal computer media console. This spring, used to lift the Direct Access Storage Device (DASD) drive housing to the operating position, rests on the console base and attaches to the upper assembly drive housing by way of the spring ends which are inserted into holes in the DASD bracket. This design is functional and reliable but is not easy to reassemble when the upper assembly must be removed for service or upgrade of the DASD. The spring becomes free from the console base once the spring ends are disengaged from the upper assembly DASD bracket which normally hold the spring in tension.

U.S. Pat. No. 5,240,319 teaches an upper body opening/closing mechanism for electronic equipment. The upper body is hinged to the lower body with a hinge pin 5 resting in U shaped groove 9. A coil spring 17 is slipped over the hinge pin 5 before assembly. The ends of the coil spring are formed outward to become tangent to the coil and to engage holes in fixture 13 and 19 mounted to the lower body 1 and upper body 3 respectively with screws. This patent suffers from the cost and difficulty of assembly and re-assembly similar to the prior art described above although the spring remains with the upper assembly rather than the base after disassembly.

U.S. Pat. 5,500,982 shows a hinge mechanism for connecting a body portion 1 to a display portion 3 in the form of an upper assembly of a portable electronic apparatus. The hinge contains a friction portion in the form of a presser spring 45 acting on an oval shaft so as to increase friction as the display is moved past the vertical and the moment arm of the center of gravity becomes longer. The hinge also has torsion bars 46 which appear to act as second hinge pins for the first 90 degrees of hinge travel.

U.S. Pat. No. 5,041,818 is directed to a lid for a computer or the like and a hinge shaft having a flat end portion 21 for engagement with the computer casing. A spring clutch 22 surrounds the hinge shaft with an interference fit. The spring has an end 29 fixed between the lid and a small cover for the mechanism. The other end 28 of the spring is formed to allow a small angle of rotation of the spring relative to the shaft. As the lid is being raised in a clockwise direction in FIG. 4B, arm 23 can fall back against the cover and slightly unwind the spring to release friction force on the shaft. When the lid is closed in the counter clockwise direction, arm 26 stays with the shaft through a small angle, allowing the spring to wind up and tighten on the shaft to control closing of the lid.

SUMMARY OF THE INVENTION

These problems of cost and assembly, re-assembly of the upper assembly to the device console base are solved by the invention which provides a lift spring which acts between supports in the console base which provide lifting purchase and stops to prevent over-travel. The invention provides a stable mechanism which remains in place during disassembly and automatically re-engages the upper component assembly during re-assembly.

Accordingly it is an advantage of the invention that the lift spring in an electronic device is removably captive in the base of the device.

It is a further advantage of the invention that the lift spring need not be aligned or inserted into apertures in the upper assembly prior to assembling the upper assembly to the base assembly.

It is also a further advantage of the invention that there is no need for screws or another fasteners in assembling the lift spring into operative position.

It is another advantage of the invention that the supports providing purchase hold the lift spring in place and in a position so that the lifting component of the spring force is greater when the upper assembly is raised into operating position and is lower when the upper assembly is in the closed position.

These and other advantages will becomes apparent from a reading of the following detailed specification of preferred embodiments of the invention and the accompanying drawings which are briefly described below.

DESCRIPTION OF A PREFERRED EMBODIMENT

Figure 1:
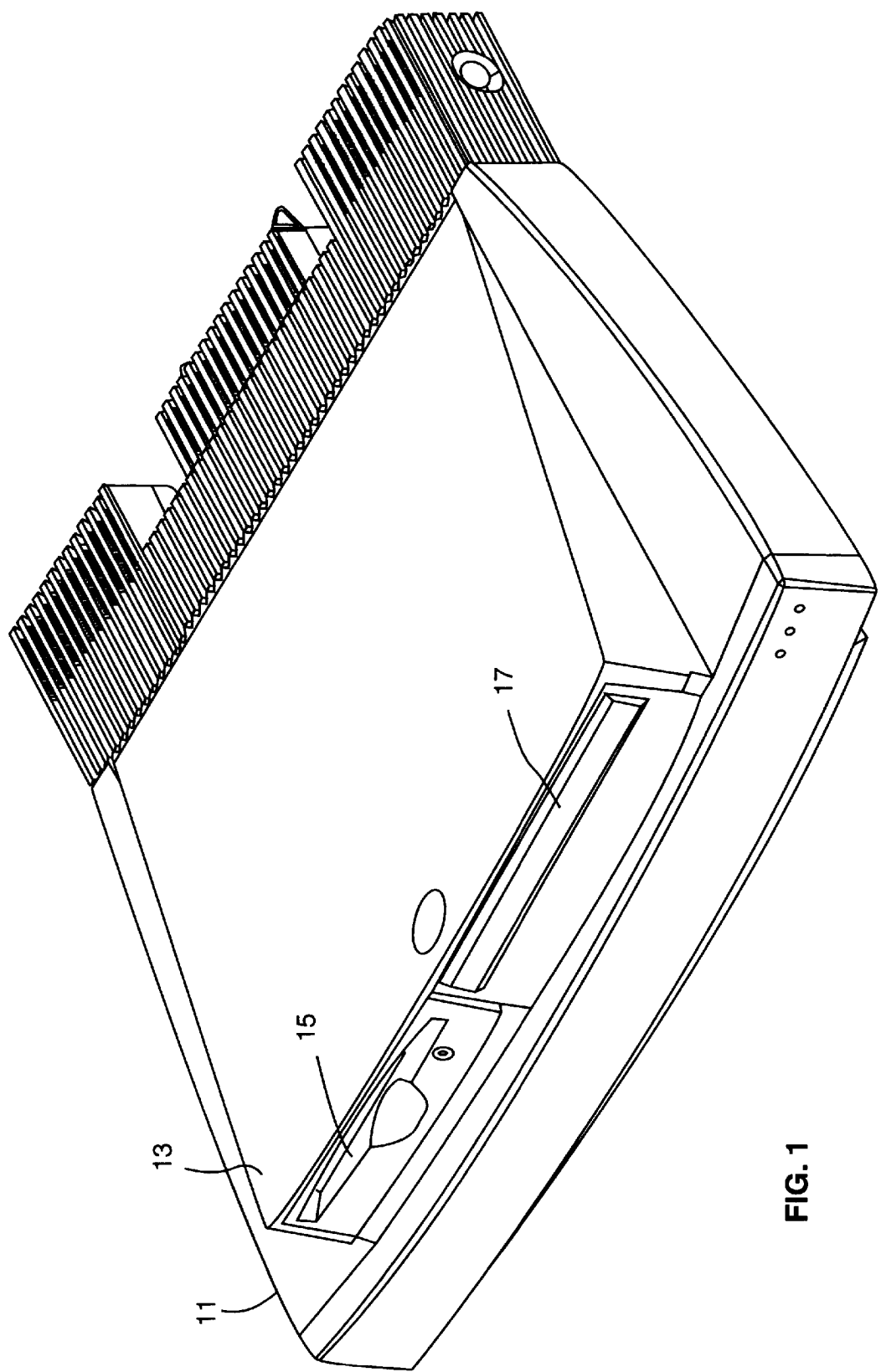
FIG. 1 shows a perspective view of the electronic device with the upper or component assembly raised into operating position.

A preferred embodiment of the invention will now be described with reference to the Figures. FIG. 1 shows an example electronic device 11 in the form of a computer media console. The upper assembly 13 of computer media console 11 is shown in its raised position where access to the diskette and CDROM insertion slots appear at 15 and 17. The upper assembly 13 may be pressed down and a latch not shown in this FIG. 1, retains the assembly in closed position. When the upper assembly is pressed down a second time, the latch releases and the upper assembly is raised into access position by the lift spring.

Figure 2:
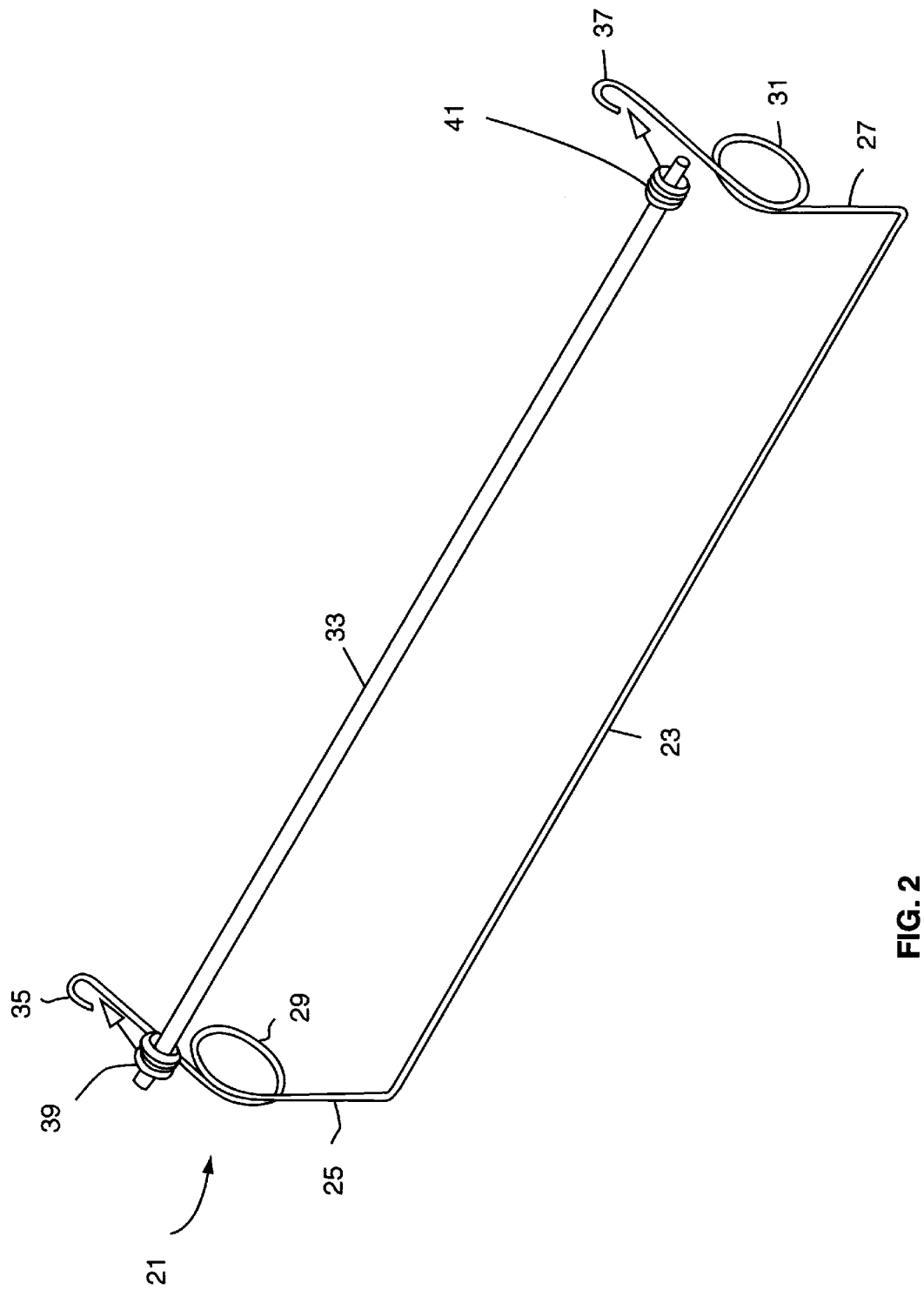
FIG. 2 shows a perspective view of the lift spring in accordance with the invention.

In FIG. 2, the lift spring 21 is shown in detail. Spring 21 is formed of round wire and has a base portion 23 in the form of a straight section of the wire in the center of the spring. It will be understood by those skilled in the art to which this invention pertains that the base portion need not be straight but can have another shape, so long as it provides a connection to and support for the legs to be described below. At each end of the base portion is a substantially right angle bend, each bend forming a right leg 25 and a left 27, the legs lying in the same plane with each other and the base portion. Each leg 25, 27 has a coil in the form of a loop 29, 31, these loops in the preferred embodiment, being at least a 360 degree loop but less than a 540 degree loop. In the event that a double or triple loop is desired, the loops will be 765 to 855 degrees or 1125 and 1215 degrees respectively. Likewise, the coil can be replaced by an open loop of approximately 5 to 120 degrees is functional but selection of the spring wire then becomes more critical so that the spring can provide the necessary force through the required distance without generating excessive force when compressed and without exceeding its elastic limit. Depending upon the spring wire chosen, only one 360 degree loop and the additional angle of 45 to 135 degrees will be found most effective. The end of each leg is attached to a rod 33. The attachment may take any one of a number of embodiments such as a spot weld or an attachment formed into the wire at the end of each leg. In the preferred embodiment, a reverse hook is provided to engage and control a rod 33. The advantage of a reverse hook is that the force will be greatest at the end of the leg and less force will be applied at the tip of the wire forming the hook. If the forces and seating of the rod to be described below can be controlled in the design, it is possible to use a hook formed in the same direction as the loop, or any of the other embodiments mentioned above or their equivalents, without departing from the spirit and scope of the invention. At the ends of rod 33 are bushings 39 and 41 which provide a seating attachment point for the hooks 35, 37 to the rod 33. The bushings also control lateral position of the rod and spring assembly as will be described in more detail below. A collar or groove could be formed in each end of rod 33 to also give a seat for the hooks 35, 37 at the ends of legs 25, 27 respectively. The advantage of the bushings is that they can be cheaply molded and mounted to the rod in an interference fit. It helps if the end of the rod is knurled in the area of the interference fit. If the bushings are not used, the rod itself becomes the lateral position control element and the end of the rod must be carefully cut and shaped to guide the rod and spring assembly between the side walls without chafing or galling and without significant friction. The cost of so cutting and shaping the rod becomes substantial. Further, the material from which the rod is made is preferably rigid and strong. This requirement narrows the material selection to a metal which is significantly likely to have adverse friction characteristics in small contact surface applications like at the end of the rod when it is working against a softer material like the plastic of the side walls of the electronic device. One of the bushings is shown in greater detail in FIG. 7. Base portion 23 and rod 33 provide spring 21 as a stable closed assembly which can be placed into the base of the electronic device 11 and remain there in a tensioned state without the need for further fastening and without the need for attachment to the upper assembly 13.

Figure 3:
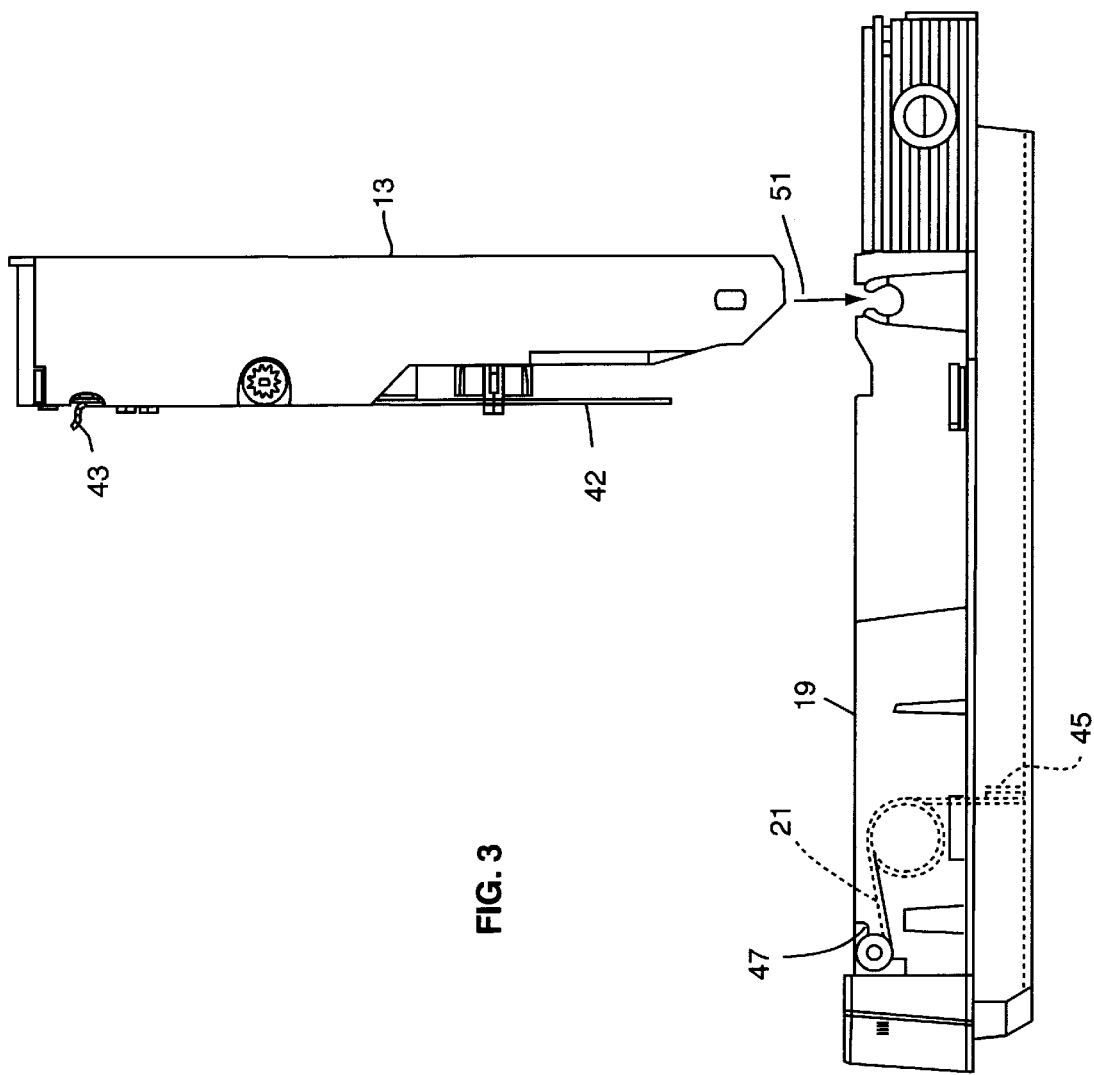
FIG. 3 is a side view of the lift spring installed into the base of the electronic device according to the invention.

Referring now to FIG. 3, the device console base 19, and the upper or component assembly, 13 are shown being connected into a pivoting relationship and the lift spring 21 of the invention is shown by arrow 51 being installed into the base 19. Upper assembly 13 has a DASD support bracket 42 which holds the media drives in place. The bracket 42 has a lip 43 which provides a seat to engage the lifting portion in the form of rod 33 between the two bushings 39 and 41. Upper assembly 13 has a relief at each side of the upper assembly which will clear rod 33 and the two bushings 39 and 41 when the upper assembly is rotated down into operating position in the base 19. The base 19 has a pair of supports 45 molded into the bottom of base 19 to support the ends of central base portion 23 of spring 21 and to provide purchase from which the lift spring 21 provides lifting force. The base 19 also has a pair of stops 47 molded into the side wall of base 19 at the front wall in order to hold spring 21 in place, and substantially centered in its working space when the upper assembly 13 is pivoted out of the base 13 for service. The stops 47 engage the ends of rod 33 outside of the two bushings 39 and 41 in the preferred embodiment. Placement of the stops on the side wall or front wall or in the corner of both walls is a matter of design choice in implementing the invention. If multiple stops are provided along the front wall, the rod itself may be replaced by continuation of the spring wire to close the lift spring. An embodiment of such closure would be to bend the spring at right angles to each leg in the lift portion area now served by the rod 33 and overlap the ends of the wire for welding to form the lift portion of the lift spring. Placement of stops in the central portion of the front wall of base 19 of course requires that slotted openings be provided in lip 43 and the upper assembly 13 so as to allow the lip 43 and assembly 13 to clear the stops when the component assembly is to be removed from the base or inserted and closed into the base as shown in FIG. 3.

Figure 4:
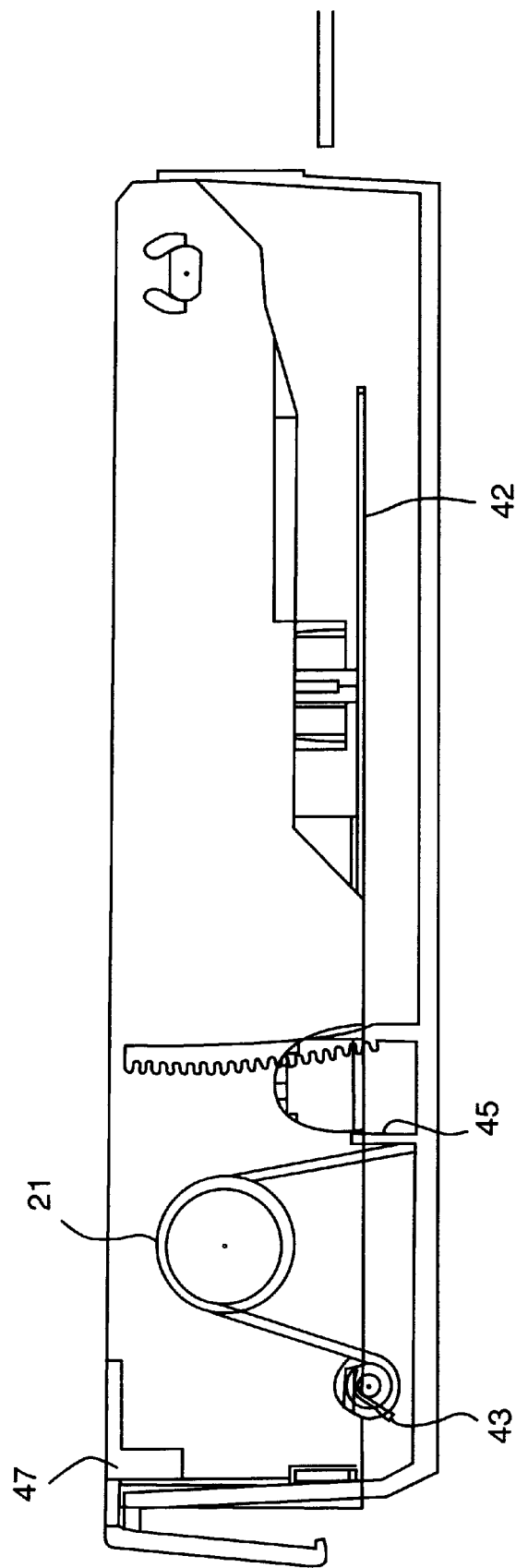
FIG. 4, shows the upper assembly closed into the base with the lift spring in its fully flexed position.

FIG. 4, shows the upper assembly 13 closed into base 19 with spring 21 in its fully flexed position ready to raise the upper assembly when the latch is released. In this Figure, the stop 47 is more clearly seen to prevent over travel in both the upward and forward directions when the rod 33 is released from lip seat 43 as the upper assembly is rotated into the vertical position for removal and servicing.

Figure 5:
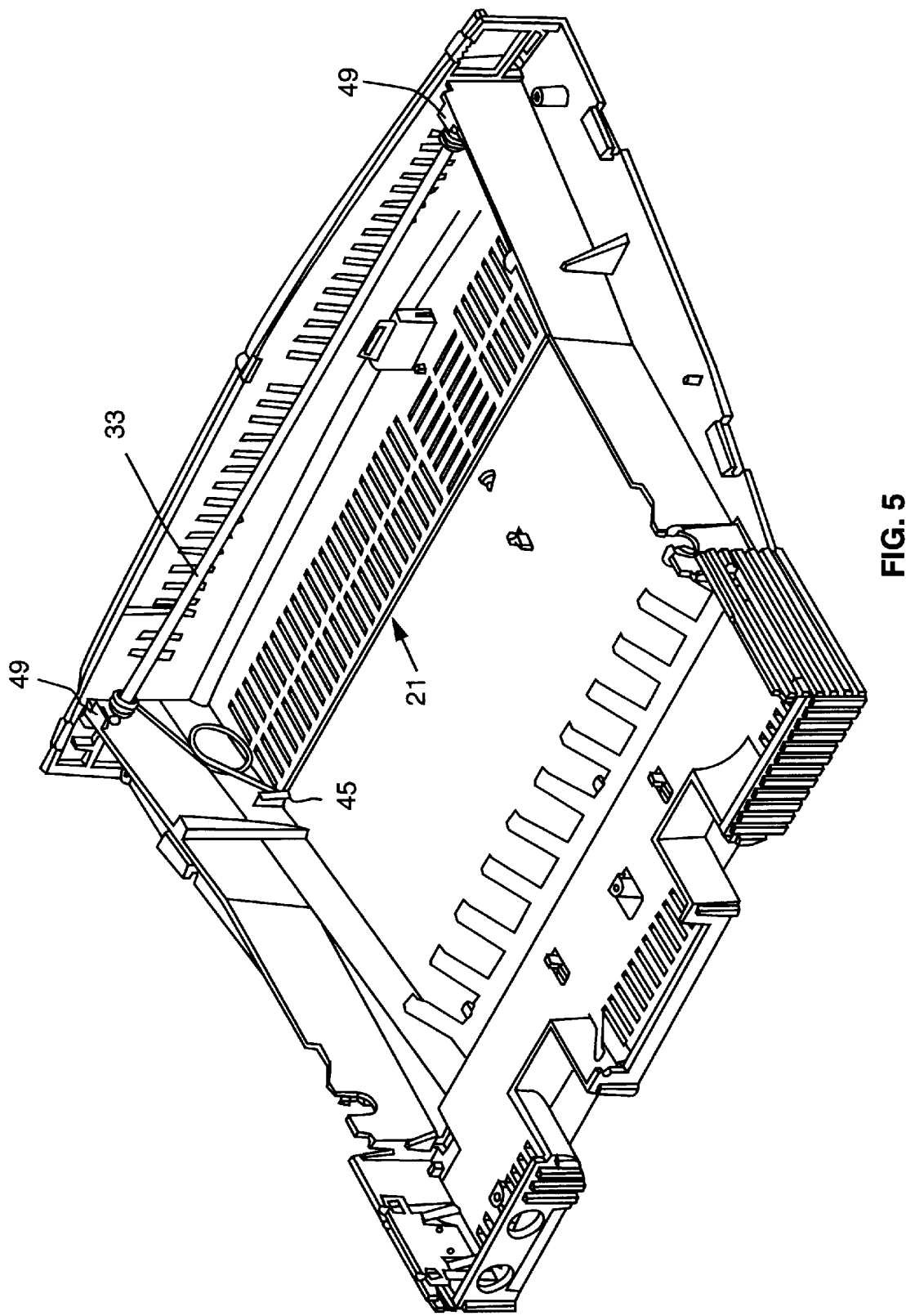
FIG. 5 is an open top, rear and side perspective view of the base showing the lift spring between supports and stops.

FIG. 5 shows a perspective view of the base 19 with the spring 21 installed ready to receive the upper assembly. FIG. 5 better shows how spring 21 is held in place between supports 45 and stops 47 in readiness for the insertion and pivoting of the upper assembly into operating position. A top portion 49 of each stop 47 is made wider than the forward portion of stop 47 so as to contact an outer chamfered edge of the outer cylindrical surface of the bushings 39, 41 and act to center the rod and bushings laterally in the base 19.

Figure 6:
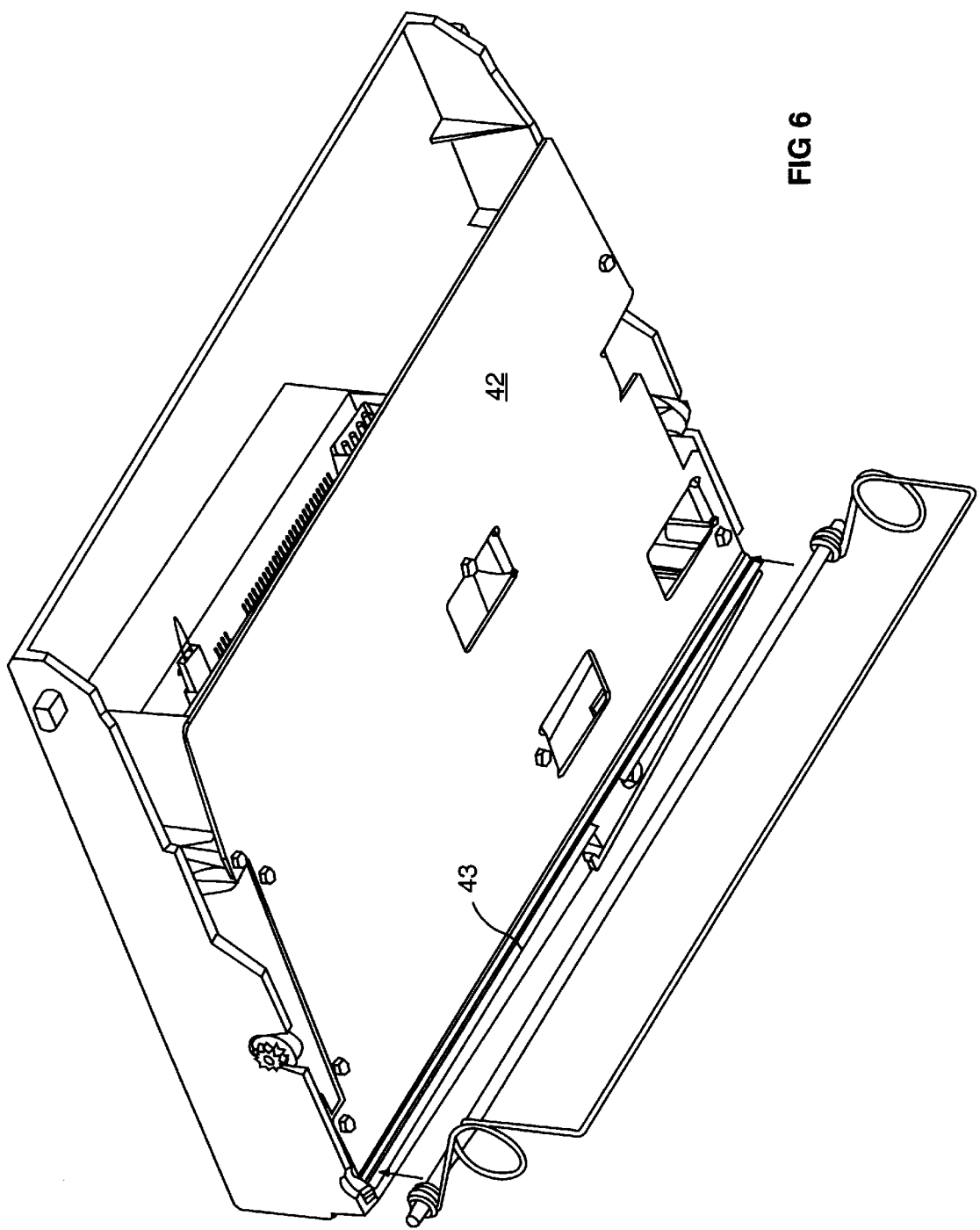
FIG. 6 is a bottom view of an example upper assembly showing how the lift spring assembly engages the upper assembly in accordance with the invention for raising it into operating position.

FIG. 6 is a bottom view of the upper assembly 13 showing how the rod 33 engages lip seat 43 of bracket 42 to provide upward force to lift the upper assembly.

Figure 7:
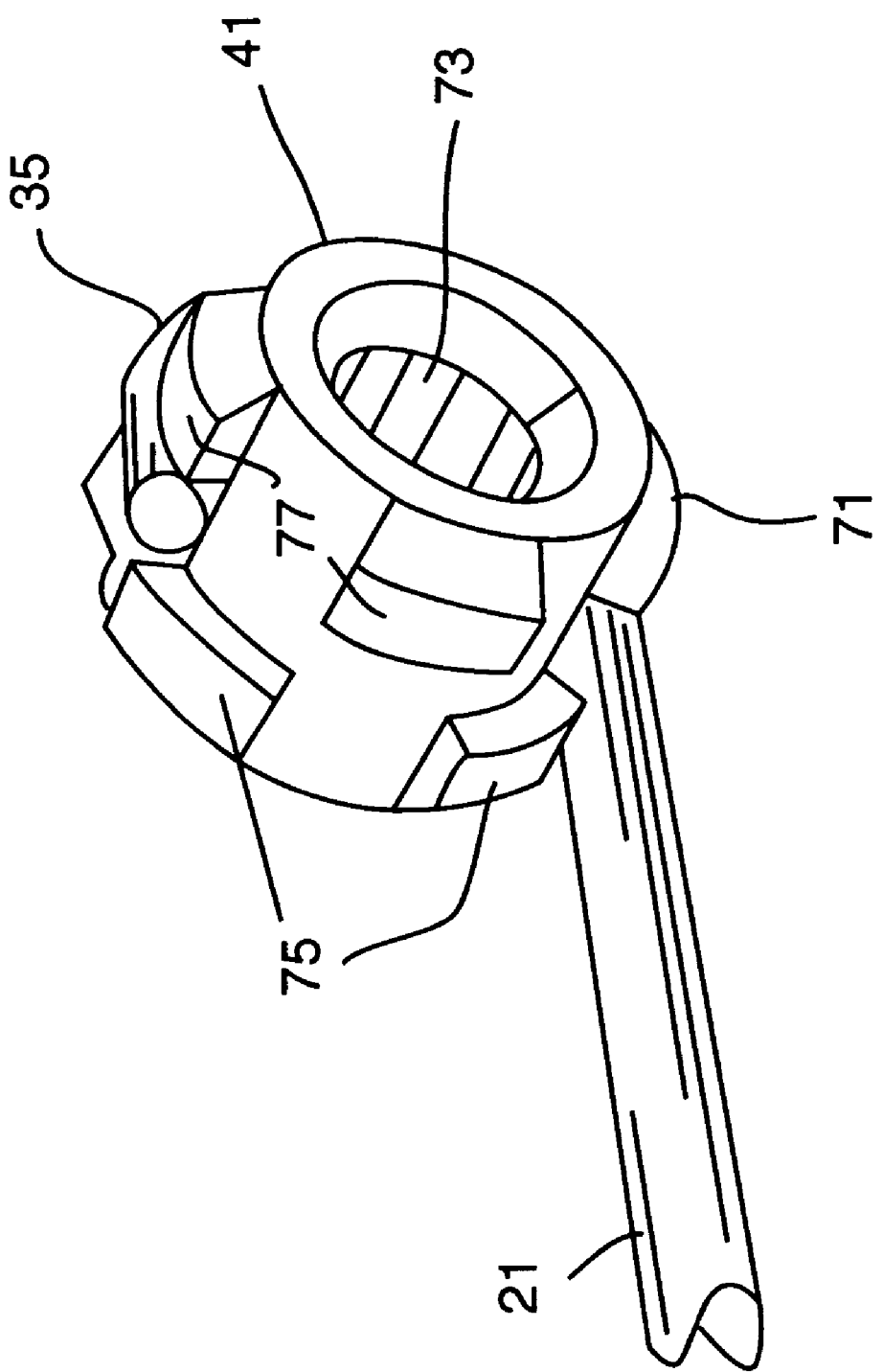
FIG. 7 is a perspective view of a novel bushing according to the invention for simplified manufacture.

FIG. 7 is a perspective view of a bushing 41 which is the same as bushing 39. Bushing 41 has chamfered edges 71 to guide the rod 33 to a central and non-interfering position between the side walls of base 19. The bore of bushing 41 has lands 73 which act as deformable interference elements to attach the bushing 41 to rod 33.

The hook end 35 of lift spring 21 is forced into the groove formed by tabs 75 and 77. The groove is formed by tabs 75 and 77 instead of continuous flanges in order to allow the bushing to be molded out of "deirin" or other equivalent plastic material in a simple two part mold that opens axially. Flanges may require three or more mold parts in order to separate and properly eject the bushing part.

Having described the invention in terms of a preferred embodiment thereof, it will be recognized by those skilled in the art of computer equipment design that various additional changes in the structure and operation of the implementation described can be made without departing from the spirit and scope of the invention which is measured by the following claims.

We claim:

1. An electronic device having an assembly containing components that become accessible for use when the assembly is raised by a lift spring, the improvement comprising:
   a lift spring having:
   a base portion substantially at the center of the spring;
   a substantially right angle bend at each end of the base portion, the spring beyond each bend forming a leg, portions of each leg near each bend lying in the same plane with each other and with the base portion;
   a loop in each leg of at least 5 degrees;
   a lift portion at substantially a right angle to each leg where the lift portion joins each leg, the lift portion engaging a portion of the assembly to be raised;
   the device further comprising:
   a base having supports in the base floor for engaging the base portion of the lift spring and providing purchase from which the lift spring provides lifting force; and
   stops projecting from a wall of the base for engaging the lift portion of the lift spring when the lift spring is in a fully extended position.

2. The electronic device of claim I wherein the supports providing purchase are positioned so that the lifting component of the spring force is greater when the assembly is raised into operating position and is lower when the assembly is in a closed position.

3. The electronic device of claim 1 wherein the stops projecting from a wall of the base, for engaging the lift spring when the lift spring is in a fully extended position while the assembly is removed for service of components mounted therein, project from the corner of a front wall and a side wall, and where an upper portion of each stop is shaped to substantially center the lift spring in its working space in order to reduce friction.

4. The electronic device of claim 1 wherein a base portion of the lift spring is in the form of a straight section substantially at the center of the spring.

5. The electronic device of claim 1 wherein the loop in each leg of the lift spring is in the form of a coiled loop of at least 360 degrees.

6. The electronic device of claim 1 wherein the lift portion of the lift spring is a rod having a seat at each end of the rod, a hook at the end of each leg engaging a seat of the rod to join each leg to a respective end of the rod.

7. The electronic device of claim 6 wherein the seat at each end of the rod further comprise bushings slipped over the rod ends, the bushings having a groove in their outer cylindrical surface for receiving a hook of one of the legs.

8. The electronic device of claim 7 wherein each bushing of the bushings have sets of tabs around their ends, the sets of tabs forming between them, the groove for receiving a hook end of the hooks ends, the tabs of one set being offset from the tabs of the other set.

9. The electronic device of claim 6 wherein the hook in the end of each leg for engaging a rod is in the form of a reverse hook, the rod having a seat at each end for receiving the reverse hook of one of the legs.

10. The electronic device of claim 6 wherein the seat at each end of the rod further comprise bushings slipped over the rod ends, the bushings having a groove in their outer cylindrical surface for receiving the hook at the ends of the spring legs, the outer edges of the outer cylindrical surface being chamfered.

11. The electronic device of claim 10 wherein the stops projecting from a wall of the base for containing the lift spring when the lift spring is in a fully extended position while the assembly is removed for service of components mounted therein project from the corner of the a front wall and a side wall and where the top portion of each stop is made wider than the forward portion of each stop so as to contact a chamfered outer circumference of the bushings and act to center the lift spring assembly.

\* \* \* \* \*